United States Patent [19]

Jarzombek et al.

[11] Patent Number: 5,288,780
[45] Date of Patent: Feb. 22, 1994

[54] WATER BASED ADHESION PROMOTING COMPOSITIONS

[75] Inventors: Richard E. Jarzombek, Munster, Ind.; William J. Yapp, Park Forest, Ill.; David W. Helms, Munster, Ind.

[73] Assignee: Tioga International, Inc., Calumet City, Ill.

[21] Appl. No.: 889,816

[22] Filed: May 29, 1992

Related U.S. Application Data

[63] Continuation-in-part of Ser. No. 668,872, Mar. 13, 1991, abandoned.

[51] Int. Cl.⁵ .................................................. C08K 5/52
[52] U.S. Cl. ................................... 524/127; 524/297; 524/314; 524/527; 524/569; 524/523; 524/524
[58] Field of Search ............... 524/527, 569, 127, 297, 524/314

[56] References Cited

U.S. PATENT DOCUMENTS 4,981,730 1/1991 Zaleski .................................. 524/525

Primary Examiner—John C. Bleutge
Assistant Examiner—Mark Sweet
Attorney, Agent, or Firm—Rockey, Rifkin and Ryther

[57] ABSTRACT

An adhesion promoting composition for use on polyolefin substrates which is formulated with a chlorinated polyolefin in a water-based emulsion.

9 Claims, No Drawings

WATER BASED ADHESION PROMOTING COMPOSITIONS

CROSS-REFERENCE TO RELATED APPLICATIONS

This application is a continuation in part of copending application Ser. No. 668,872, filed Mar. 13, 1991 now abandoned.

BACKGROUND OF THE INVENTION

The present invention relates to adhesive emulsion compositions for use on polyolefin substrates to promote adhesion thereto wherein the compositions have improved environmental properties, and specifically no substantial organic emissions.

As is well known to those skilled in the art, polyolefins are widely used in the plastics industry in the molding of a variety of products. Ever increasing among such products are molded parts for automobiles because of the resistance of such polyolefins to corrosion. One of the difficulties that has long existed in the use of polyolefins in the production of molded plastic parts is the inability to establish a secure bonding relationship between the polyolefin and any coatings to be applied to it, notably including paint coatings.

It has been proposed to employ, as an adhesion-promoting primer for polyolefins, and notably polypropylenes, a primer composition which is formulated to contain a chlorinated polyolefin. Eastman Chemical Products, Inc. has made and sold, for some time, such chlorinated polyolefins for use as adhesion promoters to polyolefins generally. Eastman, in its product brochure entitled "Eastman Chlorinated Polyolefins in Coatings for Selected Plastics" (Aug. 1988), suggests that a composition be formulated to include a chlorinated polyolefin solution sold under the trade designation "CP-343-3 (25%)" or "CP-343-1 (25%)" in combination with toluene and sulfonated castor oil and sodium lauryl sulfate as surfactants. That composition, after it is formulated, is dispersed in de-ionized water to form an aqueous dispersion for use as a primer for polypropylene.

Both of these chlorinated polyolefins are marketed by Eastman as solvent solutions containing 25 percent by weight of the chlorinated polyolefin and 75 percent by weight of xylene as the solvent. Thus, for every 100 parts by weight of the aqueous dispersion, a full third of the composition is aromatic solvent which evaporates into the atmosphere in the use of the primer composition.

There has been a long standing environmental and ecological concern about the relatively high amounts of volatile organic solvents emitted to the atmosphere from the use of various liquid products. The Environmental Protection Agency or EPA requires that solvent emissions from a variety of product applications be reduced to the minimum possible amount. Maximum allowable limits are usually based on concepts known as Best Availability Control Technology or BACT and Reasonable Available Control Technology or RACT.

Product classes which include adhesion promoters or primers for polyolefins presently allow use of compositions having an extremely high solvent content because the EPA agrees that no better technology exists.

The EPA typically expresses the magnitude of solvent emissions for a given product application by a "volatile organic compounds" or VOC value. That VOC is usually expressed as the pounds of organic solvent per gallon of thinned product, excluding water, at the point of application. Thus, for a composition containing both water and organic solvent, the VOC computation, according to the EPA rule, requires that the combination of all ingredients with the exception of water be proportioned to one gallon. The total resulting pounds of organic solvents in that quantity of composition, therefore, reflects the VOC value.

By that definition, water must be excluded, and simply diluting a product with greater amounts of water does not decrease that product's VOC value.

The formulations suggested by Eastman for a non-aqueous primer have a VOC of approximately 6.9, while its suggested formulation for an aqueous primer has a VOC of about 6.2. Commercial products typically used today average about 6.9 VOC. VOC values of 6.2 and 6.9 are extremely high values. Because commercial formulations typically involve VOC values in excess of 6, there is a substantial need for an adhesion promoting composition which exhibits a VOC not substantially above 0.

Many such composition have been proposed. See, for example, U.S. Pat. Nos. 2,664,378, 3,398,046 and 4,981,730. Those compositions previously used in the treatment of polyolefin surfaces have contained high volatile organic solvent levels, and, therefore, high VOC values. Thus, there is a need for products having a VOC value of about 0.

SUMMARY OF THE INVENTION

It is accordingly an object of the present invention to overcome the foregoing disadvantages.

It is a more specific object of the present invention to provide a composition for promoting adhesion to polyolefin substrates which is environmentally and ecologically acceptable.

It is a more specific object of the present invention to provide a composition for use in promoting adhesion to polyolefin substrates which contains a VOC level of not substantially above 0.

The concepts of the present invention reside in an adhesion-promoting composition in the form of an aqueous emulsion of a chlorinated polyolefin in the amount of 25 to 75 percent by weight and at least 20 percent by weight of a non-volatile plasticizer component. The emulsion may also be formulated to contain, as optional components, water based resins and/or pigments.

DETAILED DESCRIPTION OF THE INVENTION

The composition of the present invention is characterized by substantially no volatile organic solvent content, and is useful in the treatment of polyolefinic substrates to promote adhesion to such substrates. The substantial absence of volatile organic solvent content of the present invention provides environmental and organic uniqueness; commercial products heretofore available for use on polyolefinic substrates have contained very high amounts of volatile organic solvents, typically resulting in solvent emissions well in excess of 6 VOC. The present invention, utilizing 0 percent by weight of volatile organic solvent, provides solvent emissions of about 0.

As described in this application, the composition of the invention for a VOC value of about 0 refers to a composition in which essentially no volatile organic solvents are employed. As will be applied by those skilled in the art, it does not depart from the concepts of the invention if a composition according to the teachings of the present invention were formulated to include a very small percent of volatile organic solvent, since the VOC value contributed by such limited amounts of solvent do not raise the VOC value substantially above 0.

The composition of the present invention includes, as the non-aqueous portion, a composition of 25 to 75 percent by weight of a chlorinated polyolefin having the property of adhering to polypropylene. Such chlorinated polyolefins are well known to those skilled in the art, and include those sold by Eastman Chemical Products, Inc. under the designation "Eastman Chlorinated Polyolefins". Also suitable for use in the present invention are the chlorinated polyolefins manufactured by Sanyo-Kokusaku Pulp Co., Ltd. of Japan, marketed under the trade name "Superchlon Chlorinated Polyolefins".

Preferred among the chlorinated polyolefins are chlorinated polypropylenes which typically contain more than about 10 percent by weight, and preferably about 10 to 30 percent by weight of chlorine attached to a polypropylene backbone having a molecular weight in excess of about 5,000. Neither the chlorination level nor the molecular weight is particularly critical to the practice of the invention, but those described frequently provide preferred results.

In accordance with the practice of the invention, such chlorinated polyolefins may be formed into an aqueous dispersion or emulsion by first dissolving the chlorinated polyolefin in the plasticizer. As used herein, the term "plasticizer" refers to relatively low molecular weight liquids which have the capability of dissolving the chlorinated polyolefin to yield an emulsifiable fluid at the desired emulsification temperature, and which will not significantly increase the VOC value of the composition. By dissolving the chlorinated polyolefin in the plasticizer, the chlorinated polyolefin can be converted to an emulsifiable fluid without the need to use a volatile organic solvent commonly used in the prior art. Thus, the plasticizer is itself non-volatile.

Such plasticizers for chlorinated polyolefins are well known to those skilled in the art, and their precise chemical nature is not critical to the practice of the invention so long as they are not sufficiently volatile to contribute to the VOC value of the composition. Typical of such plasticizers known to the art include aliphatic, cyclic and aromatic esters and polyesters, low molecular weight vinyl polymerization polymers and aliphatic, aromatic or halogenated hydrocarbon oils.

Representative of the aliphatic esters as employed as plasticizers in the present invention are dioctyl adipate, di(2-ethylhexyl) azelate, dibutyl sebacate, triethylene glycol di(2-ethylhexoate), etc. Representative aromatic esters are dibutyl phthalate, butyl benzyl phthalate and tricresyl phosphate. Suitable aliphatic polyesters include polyethyleneglycoladipate and polyethyleneglycolsuccinate. Suitable aromatic polyesters are polypropyleneglycol phthalate and coconut oil glycerolphthalate.

Representative of the low molecular weight vinyl polymerization polymers and copolymers are those polymers and copolymers of styrene, alpha-methyl styrene, vinyltoluene, butene and butadiene. Suitable hydrocarbon oils include aliphatic, aromatic and naphthenic petroleum hydrocarbon oils, as well as halogenated hydrocarbon oils such as chlorinated paraffin.

It is frequently desirable in the practice of the invention to emulsify the chlorinated polyolefin which has been dissolved in the plasticizer to yield an emulsifiable fluid using a variety of commercially available surfactants or emulsifying agents. Any of a variety of conventional surfactants and emulsifiers can be used, including anionic, cationic and nonionic. Representative of such surfactants include oxyalkylated alkyl derivatives of phenols, oxyalkylated fatty esters, etc.

Representative of such surfactants are the sodium, ammonium or amine salts of fatty acids, sodium lauryl sulfate, polyethoxylated octyl and nonyl phenols, polyethoxylated fatty alcohols and esters, and quaternary fatty amine chlorides and acetates.

In addition to the surfactant, various other optional components may be added to the composition. For example, conventional additives to reduce surface tension, to provide protective colloid effects, to provide pH control, to provide stabilization and/or to provide fungus or mildew protection and the like. Such materials can be usually categorized as stabilizers and/or inhibitors.

In emulsifying the emulsifiable fluid produced by dissolving the chlorinated polyolefin in the plasticizer, it is desirable in most instances to subject the emulsifiable fluid with water, and, optionally, a surfactant, to high shear. Suitable mechanical devices for effecting such emulsification are well known to those skilled in the art. For example, laboratory size batches may be emulsified in a Waring Blender; typical commercial devices for producing emulsions including high speed dissolvers, rotor/stator mixers, sonic dispersers, colloid mills, two-roll mills, sigma mixers and the like. It is frequently desirable to carry out the emulsification at elevated temperatures. As is well known to those skilled in the art, as the temperature increases, the preferred effects of viscosity reduction and surface tension reduction typically occur to facilitate emulsification with greater ease. Therefore, elevated temperatures up to 150° F. or higher may be employed as desired.

It is also possible to formulate the composition of the present invention to contain various pigments and/or fillers. Such additives may be employed to provide desired aesthetic effects such as color; they can provide functional effects as well such as improving hardness or providing electrical conductivity in the coating on the substrate.

In accordance with another concept of the invention, the composition of the present invention can be formulated as a paint, a primer or an adhesive, the components of the composition as heretofore described providing an adhesion promoting function. Thus, the composition of the present invention can be formulated as a paint, primer or adhesive by formulating the emulsion to contain a water based resin. The chlorinated polyolefin, dispersed with the aid of the plasticizer to form the emulsion, thus serves to promote adhesion of the water based resin with the polyolefin substrate to which the paint, primer or adhesive is applied.

Such water-based resins are well known to those skilled in the art and, by themselves, are not part of the present invention. Typical water based resins include vinyl polymerization polymers, nonionic polyhydroxy polymers, urethane emulsions, neutralized carboxylic acid-containing polymers and polymers based on natural carbohydrates such as starch and/or cellulose.

Typical water-based resins include vinyl polymerization emulsion polymers and copolymers based on monomers such as butyl acrylate, methyl methacrylate, other acrylates and methacrylates, styrene, alpha methyl styrene, vinyl acetate, vinyl chloride and vinylidene chloride; polyvinyl alcohol and partially hydrolyzed polyvinyl acetate; urethane emulsions; neutralized carboxylic acid containing polymers such as high acid value alkyds and polyesters; and polymers based on natural carbohydrates such as starch and/or cellulose such as methyl cellulose, hydroxypropyl cellulose and sodium carboxymethyl cellulose.

The compositions of the present invention have been found to promote adhesion to polyolefinic substrates, typically in the form of films, extrusions, moldings and the like formed principally of high molecular weight aliphatic hydrocarbon polymers. The compositions of the present invention are particularly suitable as adhesion promoters for polypropylene, as well as copolymers of propylene with other unsaturated monomers such as ethylene. Also contemplated are the so-called EPM and EPDM polymers which are likewise well known to those skilled in the art. Also contemplated are polyolefin substrates known in the art as thermoplastic olefin plastics or TPO and thermoplastic rubber or TPR.

Having described the basic concepts of the present invention, reference is now made to the following examples which are provided by way of illustration and not by way of limitation of the practice of the invention in the formulation of compositions of the invention.

EXAMPLE 1

This example illustrates the preparation of a composition of the present invention.

A water emulsion was prepared by agitating and heating to a temperature of 190° to 200° F. 30 grams of an Eastman chlorinated polyolefin under the designation CP-343-1 (100%), 45 grams of diisononylphthalate as a plasticizer and 5 grams of a surfactant from Rohm and Haas sold under the trademark "Triton X45".

The foregoing composition is then emulsified, using a Waring blender, into the following water phase heated to 190 to 200° F. containing 250 grams of water, 2 grams of a surfactant sold by Dexter Chemical under the trademark "Dextrol OC-50", 3 grams of a protective colloid sold by DuPont under the trademark "Elvanol 90–50" and 2 grams by weight of triethanolamine.

The foregoing emulsion can thus be used directly in a treatment of, for example, polypropylene substrates to promote adhesion thereto.

EXAMPLE 2

This example illustrates the preparation of a composition containing the adhesion promoting composition of Example 1 combined with a water-based resin to form a primer for polypropylene plastic.

A quantity of 87 grams of the emulsion of Example 1 is mixed with 13 grams of acrylic latex sold by McWhorter under the trademark "Aquamac 640". The composition was sprayed on a polypropylene plastic surface and dried under forced air at a temperature ranging from 190° to 200° F.

The resulting coating had "scotch tape" adhesion to the polypropylene plastic.

EXAMPLE 3

This example is provided by way of comparison to demonstrate the effectiveness of the adhesion promoting composition of Example 1.

The acrylic latex of Example 2 (Aquamac 640) was sprayed on polypropylene plastic and dried under forced air at 190° to 200° F.

The resulting coating did not have adhesion to the polypropylene plastic.

EXAMPLE 4

This example illustrates the use of a pigmented adhesion promoting composition of the present invention.

A pigment dispersion was prepared by mixing 14 grams of titanium dioxide (R 900 from DuPont), 0.25 grams of surfactant (Dextrol OC50) and 10 grams of water. Then, that pigment dispersion was added to 100 grams of the composition of Example 2.

The pigmented composition was sprayed on polypropylene plastic and dried under forced air at a temperature of 190° to 200° F. The resulting white coating had "scotch tape" adhesion to the polypropylene plastic, and had the capability of use as a coating, or as an adhesion-promoting primer to establish a secure relationship between a paint and the polypropylene plastic.

The foregoing description of the invention and the examples contained herein are intended merely to illustrate useful embodiments of the invention, and are not intended to limit the scope of the invention as stated in the following claims. Those skilled in the art will readily recognize other embodiments which can be made within the spirit of the invention as disclosed and claimed.

We claim:

1. An adhesion-promoting composition for use on polyolefin substrates comprising an aqueous emulsion of:
   (a) from 25 percent by weight to 75 percent by weight of a chlorinated polyolefin; olefin;
   (b) at least 20 percent by weight of a plasticizer for the chlorinated polyolefin, said plasticizer being sufficiently non-volatile so as not to increase the VOC content of the composition; and said composition containing water sufficient to emulsify the composition, said composition having a VOC value of 0.

2. A composition as defined in claim 1 wherein the chlorinated polyolefin is chlorinated polypropylene.

3. A composition as defined in claim 1 wherein the chlorinated polypropylene has a chlorine content of at least about 10 percent by weight.

4. A composition as defined in claim 3 wherein the polypropylene has a molecular weight in excess of about 5,000.

5. A composition as defined in claim 1 wherein the plasticizer is selected from the group consisting of aliphatic, cyclic and aromatic esters and polyesters, low molecular weight vinyl polymerization polymers and aliphatic, aromatic or halogenated hydrocarbon oils.

6. A composition as defined in claim 1 wherein the composition contains a surfactant.

7. A composition as defined in claim 1 wherein the surfactant is selected from the group consisting of anionic, cationic and nonionic surfactants.

8. A composition as defined in claim 1 wherein the composition is also formulated to contain a water-based resin.

9. A composition as defined in claim 1 wherein the water based resin is selected from the group consisting of vinyl polymerization polymers, nonionic polyhydroxy polymers, urethane emulsions, neutralized carboxylic acid-containing polymers and carbohydrate polymers.

* * * * *

UNITED STATES PATENT AND TRADEMARK OFFICE
CERTIFICATE OF CORRECTION

PATENT NO. : 5,288,780
DATED : February 22, 1994
INVENTOR(S) : Jarzombek et al.

It is certified that error appears in the above-indentified patent and that said Letters Patent is hereby corrected as shown below:

Column 6, line 34, claim 1, after "polyolefin", delete "olefin;"

Signed and Sealed this

Twelfth Day of July, 1994

Attest:

BRUCE LEHMAN

Attesting Officer

Commissioner of Patents and Trademarks